United States Patent
Wang et al.

(10) Patent No.: US 11,787,404 B2
(45) Date of Patent: Oct. 17, 2023

(54) SYSTEMS AND METHODS FOR PERSONALIZING ADAPTIVE CRUISE CONTROL IN A VEHICLE

(71) Applicant: Toyota Motor Engineering & Manufacturing North America, Inc., Plano, TX (US)

(72) Inventors: Yanbing Wang, Nashville, TN (US); Ziran Wang, San Jose, CA (US); Kyungtae Han, Palo Alto, CA (US); Rohit Gupta, Santa Clara, CA (US); Prashant Tiwari, Santa Clara, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 180 days.

(21) Appl. No.: 17/387,045

(22) Filed: Jul. 28, 2021

(65) Prior Publication Data
US 2023/0047354 A1    Feb. 16, 2023

(51) Int. Cl.
*B60W 30/16*    (2020.01)
*B60W 50/00*    (2006.01)
*B60W 60/00*    (2020.01)

(52) U.S. Cl.
CPC ...... *B60W 30/162* (2013.01); *B60W 50/0097* (2013.01); *B60W 50/0098* (2013.01);
(Continued)

(58) Field of Classification Search
CPC ..... B60W 30/14; B60W 30/143; B60W 30/16
See application file for complete search history.

(56) References Cited

U.S. PATENT DOCUMENTS 9,950,707 B2    4/2018    Tan et al.
2015/0203108 A1    7/2015    Loria et al.
(Continued)

FOREIGN PATENT DOCUMENTS

CN    106114511 B    11/2016

OTHER PUBLICATIONS

He, D. and Peng, B. (2020), Gaussian learning-based fuzzy predictive cruise control for improving safety and economy of connected vehicles. IET Intell. Transp. Syst., 14: 346-355. https://doi.org/10.1049/iet-its.2019.0452 (Year: 2020).*
(Continued)

*Primary Examiner* — Geepy Pe
*Assistant Examiner* — Clint Pham
(74) *Attorney, Agent, or Firm* — Christopher G. Darrow; DARROW MUSTAFA PC

(57) ABSTRACT

Systems and methods for personalizing adaptive cruise control in a vehicle are disclosed herein. One embodiment collects vehicle-following-behavior data associated with a particular driver; trains a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver; generates an acceleration command for the vehicle based, at least in part, on the set of ACC parameters; applies a predictive safety filter to the acceleration command to produce a certified acceleration command that has been vetted for safety; and controls acceleration of the vehicle automatically in accordance with the certified acceleration command to regulate a following distance between a lead vehicle and the vehicle in accordance with the learned vehicle-following behavior of the particular driver.

17 Claims, 8 Drawing Sheets

(52) U.S. Cl.
CPC ... *B60W 60/001* (2020.02); *B60W 2050/0029* (2013.01); *B60W 2050/0052* (2013.01); *B60W 2540/30* (2013.01); *B60W 2554/4042* (2020.02); *B60W 2556/45* (2020.02)

(56) References Cited

U.S. PATENT DOCUMENTS

| | | | |
|---|---|---|---|
| 2019/0367025 A1* | 12/2019 | Pathak | B60W 40/04 |
| 2020/0010084 A1* | 1/2020 | Pathak | G06V 20/588 |
| 2020/0150684 A1* | 5/2020 | Kim | G05D 1/0287 |
| 2021/0097408 A1 | 4/2021 | Sicconi et al. | |

OTHER PUBLICATIONS

Rajamani, "Longitudinal Vehicle Dynamics," Vehicle dynamics and control, Springer Science & Business Media, Chapter 4, pp. 87-111, 2011.

Rajamani, "Adaptive Cruise Control," Vehicle dynamics and control, Springer Science & Business Media, Chapter 6, pp. 141-170, 2011.

Fan et al., "What Is Personalization? Perspectives on the Design and Implementation of Personalization in Information Systems," Journal of Organizational Computing and Electronic Commerce, 16:3-4, 179-202, DO10.1080/10919392.2006.9681199.

Ma et al., "Genetic Algorithm-Based Optimization Approach and Generic Tool for Calibrating Traffic Microscopic Simulation Parameters," Transportation Research Record, vol. 1800, No. 1, pp. 6-15, 2002.

Papathanasopoulou et al., "Towards data-driven car-following models," Transportation Research Part C: Emerging Technologies, vol. 55, pp. 496-509, 2015.

Bando et al., "Structure Stability of Congestion in Traffic Dynamics," Japan Journal of Industrial and Applied Mathematics, vol. 11, pp. 203-223, 1994.

Stepancic et al., "Gaussian process model-based system identification toolbox for matlab," 8 pages, 2017, found at: https://github.com/Dynamic-Systems-and-GP/GPdyn (last accessed Oct. 12, 2021).

Wang et al., "Gaussian Process Dynamical Models for Human Motion," IEEE transactions on pattern analysis and machine intelligence, vol. 30, No. 2, pp. 283-298, 2007.

Akametalu et al., "Reachability-Based Safe Learning with Gaussian Processes," 53rd IEEE Conference on Decision and Control, pp. 1424-1431, IEEE, 2014.

Hasenjager et al., "A Survey of Personalization for Advanced Driver Assistance Systems," in IEEE Transactions on Intelligent Vehicles, vol. 5, No. 2, pp. 335-344, 2019.

Hewing et al., "Cautious Model Predictive Control Using Gaussian Process Regression," found at arXiv:1705.10702v4 [cs.SY] Dec. 29, 2019.

Baraeket et al., "Methodology for assessing adaptive cruise control behavior," IEEE Transactions on Intelligent Transportation Systems, vol. 4, No. 3, pp. 123-131, 2003.

Wang et al., "Gaussian Process Dynamical Models for Human Motion," in IEEE Transactions on Pattern Analysis and Machine Intelligence, vol. 30, No. 2, pp. 283-298, Feb. 2008.

Wang et al., "Online parameter estimation methods for adaptive cruise control systems," in IEEE Transactions on Intelligent Vehicles, 2020.

Wabersich et al., "Linear model predictive safety certification for learning-based control", found at arXiv:1803.08552v1 [cs.SY] Mar. 22, 2018.

Bao et al., "Personalized Safety-Focused Control by Minimizing Subjective Risk," 2019 IEEE Intelligent Transportation Systems Conference (ITSC), Auckland, NZ, Oct. 27-30, 2019, found at https://www.researchgate.net/profile/Naren-Bao/publication/336890316_Personalized_Safety-focused_Control_by_Minimizing_Subjective_Risk/links/5ee7135a458515814a5e9b08/Personalized-Safety-focused-Control-by-Minimizing-Subjective-Risk.pdf.

Yi et al., "A Machine Learning Based Personalized System for Driving State Recognition," submitted to Transportation Research Part C: Emerging Technologies, May 28, 2019, found at https://repository.lboro ac.uk/articles/journal_contribution/A_machine_learning_based_personalized_system_for_driving_state_recognition/9458711/files/17082161.pdf ("Yi").

Girard, Approximate methods for propagation of uncertainty with Gaussian process models. PhD thesis, Citeseer, 2004.

Milanes et al., "Modeling cooperative and autonomous adaptive cruise control dynamic responses using experimental data". Transportation Research Part C: Emerging Technologies, 48:285-300, 2014.

Yi et al., "Implicit Personalization in Driving Assistance: State-of-the-Art and Open Issues," IEEE Transactions on Intelligent Vehicles, 2019, found at http://repository.essex.ac.uk/25964/1/FINAL%20VERSION.pdf.

Burnham et al., "Identification of human driver models in car following," in IEEE Transactions on Automatic Control, vol. 19, No. 6, pp. 911-915, Dec. 1974.

Bando et al., "Dynamical model of traffic congestion and numerical simulation". Physical Review E, 51(2):1035-1042, 1995.

Treiber et al., "Congested traffic states in empirical observations and microscopic simulations", found at: arXiv:cond-mat/0002177v2 [cond-mat.stat-mech] Aug. 30, 2000.

Gunter et al., "Modeling adaptive cruise control vehicles from experimental data: model comparison". In 2019 IEEE Intelligent-Transportation Systems Conference (ITSC), pp. 3049-3054, 2019.

Chandler et al., "Traffic dynamics: studies in car following". Operations Research, 6(2):165-184, 1958.

Nilson et al., "Car-following models: fifty years of linear stability analysis—a mathematical perspective". Transportation Planning and Technology, 34(1):3-18, 2011.

Wang et al., "Identifiability of car-following dynamic.", found at: arXiv:2103.08652v1 [math.DS] Mar. 15, 2021.

Sutton et al., (Abstract) "Reinforcement Learning: An Introduction," in IEEE Transactions on Neural Networks, vol. 9, No. 5, pp. 1054-1054, Sep. 1998.

Van Otterlo et al., "Reinforcement Learning and Markov Decision Processes". Springer ISBN: 978-3-642-27645-3, 2012.

Kuderer et al., "Learning driving styles for autonomous vehicles from demonstration," 2015 IEEE International Conference on Robotics and Automation (ICRA), Seattle, WW, USA, 2015, pp. 2641-2646.

Billings, (Abstract) "Nonlinear system identification: NARMAX methods in the time, frequency, and spatio-temporal domains", John Wiley & Sons, 2013.

Giannakis et al., "A bibliography on nonlinear system identification", Signal Processing, vol. 81, 3, 2001, pp. 533-580.

Jung, "System Identification". In: Procházka A., Uhlíř J., Rayner P.W.J., Kingsbury N.G. (eds) Signal Analysis and Prediction. Applied and Numerical Harmonic Analysis. Birkhauser, Boston, MA. https://doi.org/10.1007/978-1-4612-1768-8_11 (1998).

Brunton et al., Discovering Governing Equations from Data by Sparse identification of nonlinear dynamics systems Proceedings of the National Academy of Sciences Apr. 2016, 113 (15) 3932-3937.

Babuska, "Neuro-Fuzzy Methods for Modeling and Identification", In: Abraham A., Jain L.C., Kacprzyk J. (eds) Recent Advances in Intelligent Paradigms and Applications. Studies in Fuzziness and Soft Computing, vol. 113. Physica, Heidelberg (2003).

Deisenroth "Efficient Reinforcement Learning using GaussianProcesses". PhD thesis, 2010.

Kocijan et al., "Dynamic systems identification with gaussian processes", Mathematical and Computer Modeling of Dynamical Systems, vol. 11, No. 4, pp. 411-424, 2005.

Gipps, "A behavioural car-following model for computer simulation". Transportation Research Part B: Methodological, 15(2):105-111, 1981.

Stern et al., "Dissipation of stop-and-go waves via control of autonomous vehicles: Field experiments," Transportation Research Part C: Emerging Technologies, vol. 89, pp. 205-221, 2018.

Wang et al., "Lookup table based consensus algorithm for real-time longitudinal motion control of connected and automated vehicles," in 2019 American Control Conference (ACC), pp. 5298-5303, 2019.

(56) References Cited

OTHER PUBLICATIONS

Ames et al., "Control barrier function based quadratic programs for safety critical systems," IEEE Transactions on Automatic Control, vol. 62, No. 8, pp. 3861-3876, 2016.

Ames et al., "Control barrier functions: Theory and applications," in 2019 18th European Control Conference (ECC), pp. 3420-3431, IEEE, 2019.

Xiang, "Output reachable set estimation and verification for multilayer neural networks," IEEE transactions on neural networks and learning systems, vol. 29, No. 11, pp. 5777-5783, 2018.

Wang et al., "Using trajectory data to analyze intradriver heterogeneity in car-following," Transportation Research Record, vol. 2188, No. 1, pp. 85-95, 2010.

Rasmussen, "Gaussian Processes in Machine Learning" pp. 63-71. Bedin, Heidelberg: Springer Beriin Heidelberg, 2004.

De Souza et al., "Calibrating microscopic car following models for adaptive cruise control vehicles: a multi-objective approach," 2020.

Wang et al., "Driver behavior modeling using game engine and real vehicle: A learning-based approach," IEEE Transactions on Intelligent Vehicles, vol. 5, No. 4, pp. 738-749, 2020.

Wang et al., "Cooperative ramp merging system: Agent-based modeling and simulation using game engine," SAE International Journal of Connected and Automated Vehicles, vol. 2, No. 2, 2019.

Liu et al., "Sensor fusion of camera and cloud digital twin information for intelligent vehicles," in IEEE Intelligent Vehicles Symposium (IV), Jun. 2020.

Milanes et al., "Cooperative adaptive cruise control in real traffic situations," IEEE Transactions on Intelligent Transportation Systems, vol. 15, No. 1, pp. 296-305, 2014. [48] Y. Wang, G. Gunter, M. Nice, M.

Rong et al., "LGSVL simulator: A high fidelity simulator for autonomous driving," in 2020 IEEE 23rd International Conference on IntelligentTransportation Systems (ITSC), pp. 1-6, IEEE, 2020.

Shladover, et al., "Automated vehicle control developments in the path program," IEEE Transactions on vehicular technology, vol. 40, No. 1, pp. 114-130, 1991.

Ciuffo et al., ""No free lunch" theorems applied to the calibration of traffic simulation models," IEEE Transactions on Intelligent Transportation Systems, vol. 15, No. 2, pp. 553-562, 2014.

Liang et al., "Optimal adaptive cruise control with guaranteed string stability," Vehicle System Dynamics, vol. 32, No. 4-5, pp. 313-330, 1999.

Dosovitskiy et al., "Carla: An open urban driving simulator," arXiv preprint arXiv:1711.03938, 2017.

Tedrake, "Underactuated robotics: Learning, planning, and control for efficient and agile machines course notes for mit 6.832," Working draft edition, vol. 3, 2009.

Ma et al., "New simulation tools for training and testing automated vehicles," in Road Vehicle Automation 7 (G. Meyer and S. Beiker, eds ), (Cham), pp. 111-119, Springer International Publishing, 2020.

U.S. Appl. No. 17/216,924, Determining a Setting for a Cruise Control to Han et al., filed Mar. 30, 2021.

\* cited by examiner

SYSTEMS AND METHODS FOR PERSONALIZING ADAPTIVE CRUISE CONTROL IN A VEHICLE

TECHNICAL FIELD

The subject matter described herein generally relates to vehicles and, more particularly, to systems and methods for personalizing adaptive cruise control in a vehicle.

BACKGROUND

Adaptive Cruise Control (ACC) is an increasingly common feature in newer vehicles. An ACC system, based on information from onboard sensors (e.g., radar, lasers, cameras), automatically adjusts the speed of the vehicle to maintain a safe following distance from a lead vehicle traveling ahead of the vehicle in the same lane of traffic. One challenge in implementing an ACC system is that drivers differ in their vehicle-following behavior. Some drivers like to follow with an ample safety margin (e.g., even greater than the well-known three-second rule), whereas other more aggressive drivers prefer to follow more closely. It is, therefore, difficult to design an ACC system that satisfies drivers' diverse personal vehicle-following preferences.

SUMMARY

An example of a system for personalizing adaptive cruise control in a vehicle is presented herein. The system comprises one or more processors and at least one memory communicably coupled to at least one of the one or more processors. The at least one memory stores a data collection module including instructions that when executed by the one or more processors cause the one or more processors to collect vehicle-following-behavior data associated with a particular driver. The at least one memory also stores a training module including instructions that when executed by the one or more processors cause the one or more processors to train a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver. The at least one memory also stores an ACC module including instructions that when executed by the one or more processors cause the one or more processors to generate an acceleration command for the vehicle based, at least in part, on the set of ACC parameters. The ACC module also includes instructions that when executed by the one or more processors cause the one or more processors to apply a predictive safety filter to the acceleration command to produce a certified acceleration command that has been vetted for safety. The ACC module also includes instructions that when executed by the one or more processors cause the one or more processors to control acceleration of the vehicle automatically in accordance with the certified acceleration command to regulate a following distance between a lead vehicle and the vehicle in accordance with the learned vehicle-following behavior of the particular driver.

Another embodiment is a non-transitory computer-readable medium for personalizing adaptive cruise control in a vehicle and storing instructions that when executed by one or more processors cause the one or more processors to collect vehicle-following-behavior data associated with a particular driver. The instructions also cause the one or more processors to train a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver. The instructions also cause the one or more processors to generate an acceleration command for the vehicle based, at least in part, on the set of ACC parameters. The instructions also cause the one or more processors to apply a predictive safety filter to the acceleration command to produce a certified acceleration command that has been vetted for safety. The instructions also cause the one or more processors to control acceleration of the vehicle automatically in accordance with the certified acceleration command to regulate a following distance between a lead vehicle and the vehicle in accordance with the learned vehicle-following behavior of the particular driver.

In another embodiment, a method of personalizing adaptive cruise control in a vehicle is disclosed. The method comprises collecting vehicle-following-behavior data associated with a particular driver. The method also includes training a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver. The method also includes generating an acceleration command for the vehicle based, at least in part, on the set of ACC parameters. The method also includes applying a predictive safety filter to the acceleration command to produce a certified acceleration command that has been vetted for safety. The method also includes controlling acceleration of the vehicle automatically in accordance with the certified acceleration command to regulate a following distance between a lead vehicle and the vehicle in accordance with the learned vehicle-following behavior of the particular driver.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of an adaptive cruise control (ACC) system disclosed herein overcome the problem of drivers' diverse vehicle-following preferences by adding personalization such that the system performs within a given driver's most comfortable operating range. Human-like driving involves a variety of subtleties that are difficult to encode manually in the design of a controller. Consequently, the various embodiments described herein approach the problem of personalized ACC design in a data-driven manner. More specifically, the various embodiments learn the vehicle-following style of a particular driver from collected naturalistic vehicle-following-behavior data associated with that particular driver using Gaussian Process (GP) Regression. Once trained, the personalized ACC system controls a vehicle's vehicle-following dynamic in accordance with the learned vehicle-following behavior of the particular driver. Additionally, the various embodiments include a predictive safety filter that ensures acceleration commands output by the ACC system to control the vehicle's vehicle-following behavior satisfy predetermined safety requirements (e.g., not following a lead vehicle too closely or striking the lead vehicle). In some embodiments, the learned personalized ACC parameters modeling the vehicle-following behavior of a particular driver can be updated based on additional collected naturalistic vehicle-following-behavior data. In some embodiments, nonlinear output-error (NOE) is used in conjunction with the GP Regression model to improve the accuracy of the training process.

In some embodiments, a cloud-based architecture enables the training of the GP Regression model (implemented using, e.g., one or more neural networks) to be performed at a cloud or edge server, and a set of ACC parameters modeling the learned vehicle-following behavior of a particular driver are stored at the cloud or edge server and downloaded as needed to a vehicle operated by the particular driver. This enables an ACC unit installed in the vehicle to generate acceleration commands that are based, at least in part, on the downloaded set of ACC parameters for the particular driver. In other embodiments, the training of the GP Regression model is performed by a standalone in-vehicle ACC system as the particular driver operates the vehicle in a manual driving mode.

Figure 1:
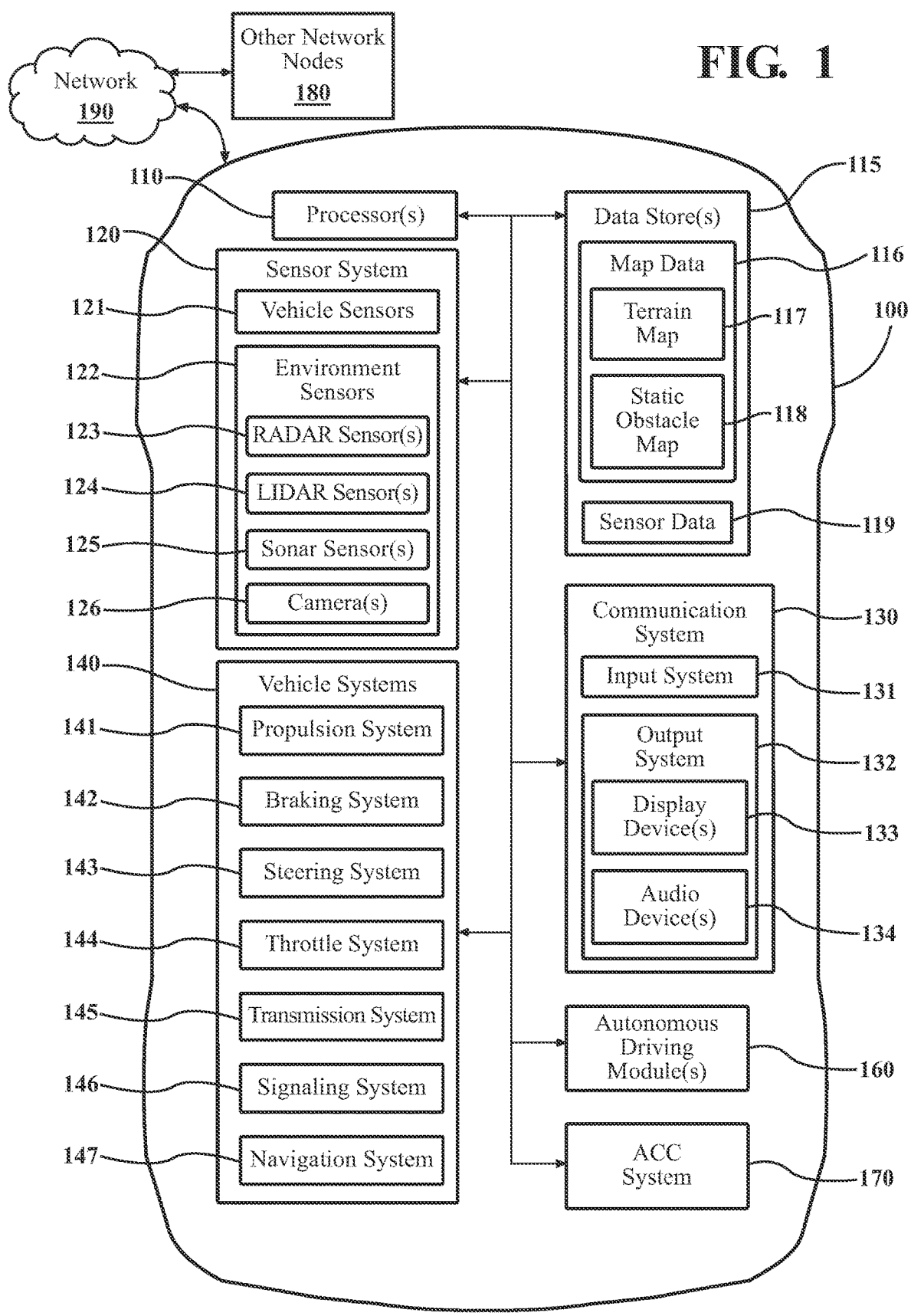
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. A vehicle 100 is sometimes referred to herein as an "ego vehicle" (a vehicle whose vehicle-following behavior relative to a lead vehicle is analyzed and/or controlled in connection with an ACC system). As used herein, a "vehicle" is any form of motorized transport. One example of a "vehicle," without limitation, is an automobile.

In some embodiments, vehicle 100 is manually driven by a human driver, and an ACC system installed in vehicle 100, when activated, adaptively controls acceleration/deceleration and vehicle-following behavior. In other embodiments, vehicle 100 can operate, at least some of the time, in a mostly- or fully-autonomous mode (e.g., what the automotive industry refers to as autonomy Levels 3-5). In such an embodiment, the vehicle's vehicle-following behavior can be based on a GP Regression model learned from the vehicle-following-behavior data associated with a particular human driver. In some embodiments, vehicle 100 includes an intelligent driving assistance system such as an Advanced Driver-Assistance System (ADAS) (not shown in FIG. 1), of which an ACC system is one aspect.

The vehicle 100 can include an adaptive cruise control (ACC) System 170 or capabilities to support or interact with the ACC system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including ACC system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 180 (e.g., other connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122, particularly radar sensors, can be used to detect, among other things, a lead vehicle and to measure the distance between the front of an ego vehicle 100 and the rear of the lead vehicle (i.e., the following distance or "space gap"). Herein, a "lead vehicle" refers to a vehicle immediately ahead of the ego vehicle 100 traveling in the same lane of traffic as the ego vehicle 100.

In embodiments in which vehicle 100 is capable of semi-autonomous or fully autonomous operation, vehicle 100 includes autonomous driving module(s) 160 to control autonomous or semi-autonomous operation. As mentioned above, in some embodiments, the autonomous driving module(s) 160 can make use of the ACC techniques described herein to control the distance at which an ego vehicle 100 operating in an autonomous driving mode follows a lead vehicle and to do so in a personalized manner that mimics the vehicle-following behavior of a particular driver whose vehicle-following style has previously been learned by the system. In other embodiments, the particular driver steers an ego vehicle 100 while the ACC system 170 is engaged.

The remainder of this Description is organized as follows. First, a high-level overview of the various embodiments of an ACC system 170 is provided in connection with a discussion of FIGS. 2-5. Second, a more detailed description of certain embodiments, including underlying mathematical concepts, is provided in connection with a discussion of FIGS. 6A-7. Finally, the methods of the various embodiments disclosed herein are discussed in connection with the flowchart of FIG. 8.

Figure 2:
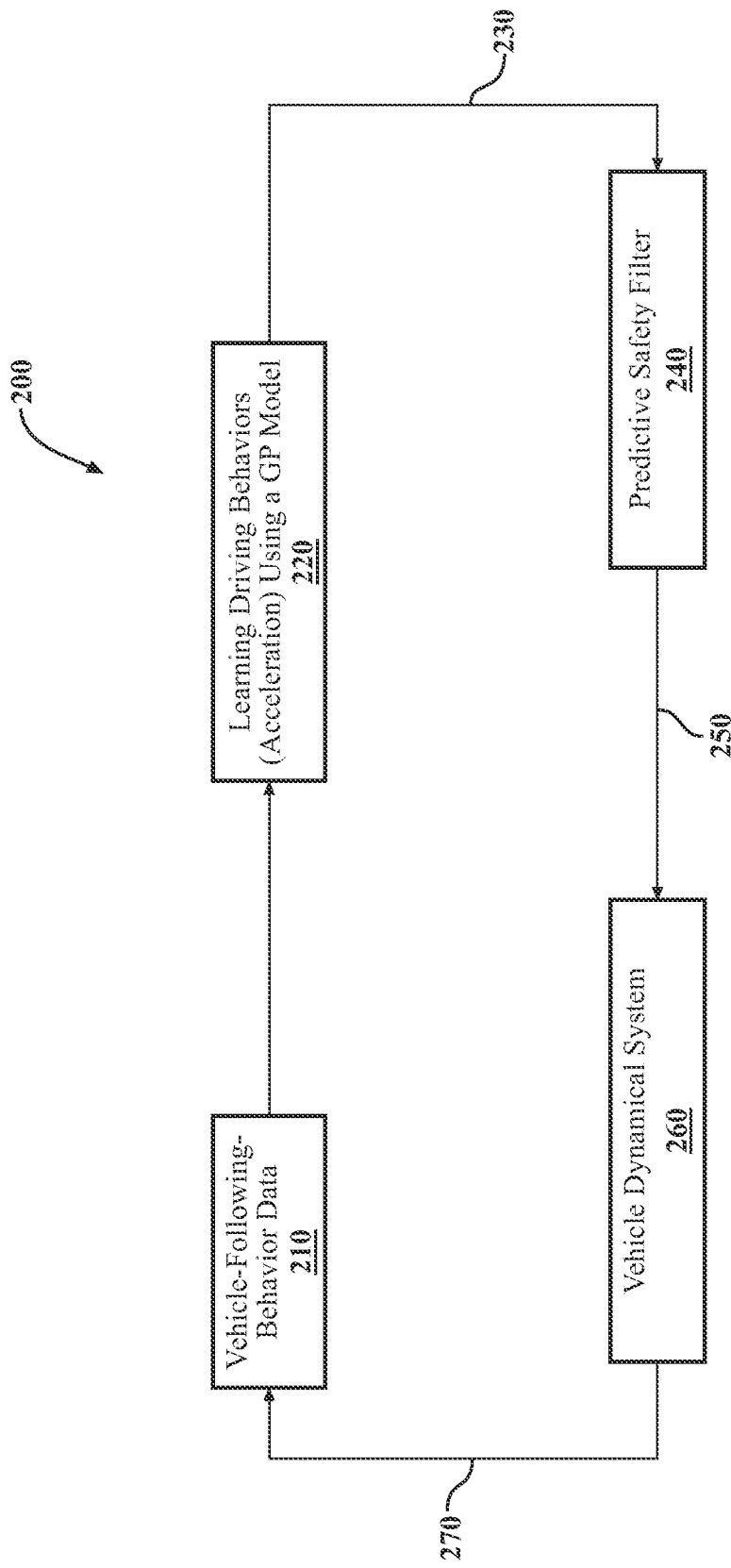
FIG. 2 is a process flow to personalize adaptive cruise control in a vehicle, in accordance with an illustrative embodiment of the invention.

FIG. 2 is a process flow to personalize ACC in a vehicle, in accordance with an illustrative embodiment of the invention. In the embodiment of FIG. 2, vehicle-following-behavior data 210 associated with a particular driver is collected and input to GP-model training process 220. The trained GP model outputs acceleration commands 230 that are processed by a predictive safety filter 240 to ensure the ultimate acceleration commands that are used to control a vehicle 100 comply with predetermined safety requirements. Certified acceleration commands 250 from predictive safety filter 240 are used to control the vehicle dynamical system 260 of vehicle 100 (e.g., aspects of vehicle 100 involving acceleration and deceleration such as an engine throttle and a braking system). In this context, "certified" simply means that the acceleration commands have been processed by the predictive safety filter 240 to ensure that they satisfy certain predetermined safety requirements (e.g., that the vehicle 100 not follow a lead vehicle too closely or collide with the lead vehicle). In other words, the certified acceleration commands 250 have been vetted for safety through being processed by predictive safety filter 240. In some cases, this means that predictive safety filter 240 modifies an acceleration command 230 somewhat for safety reasons. In other cases, an acceleration command 230 might not undergo any alteration by predictive safety filter 240, if the original acceleration command 230 already satisfies safety requirements. As explained further below, in some embodiments, the predictive safety filter 240 is designed to alter the acceleration commands 230 as little as possible.

As shown in FIG. 2, measurements 270 from the sensor system 120 of vehicle 100 can be used to collect additional vehicle-following-behavior data 210 for the particular driver, if needed, and the personalized GP model can be updated through additional training, in some embodiments.

Figure 3:
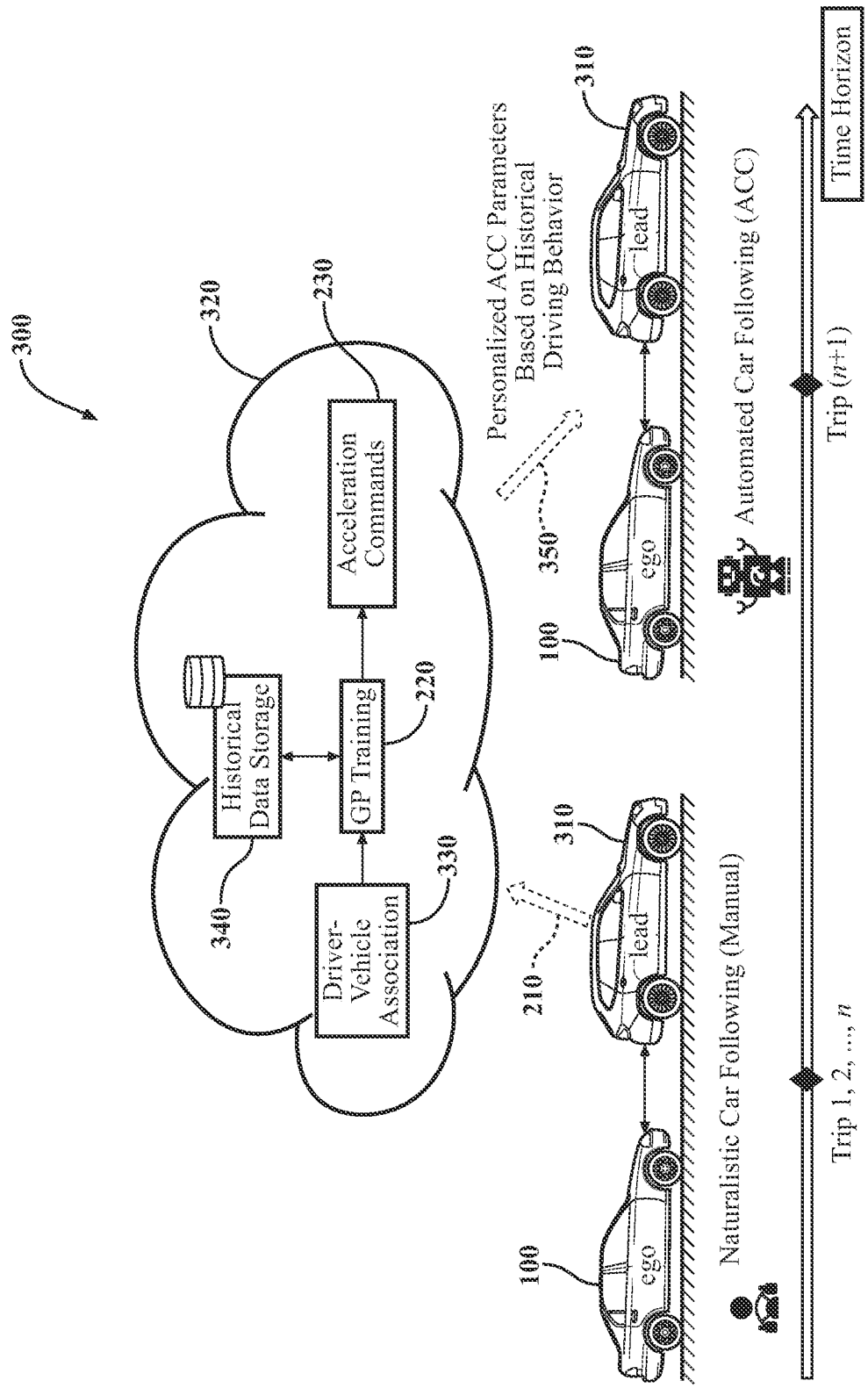
FIG. 3 is a personalized adaptive cruise control architecture, in accordance with an illustrative embodiment of the invention.

FIG. 3 is a personalized ACC architecture, in accordance with an illustrative embodiment of the invention. As shown in FIG. 3, an ego vehicle 100 is following a lead vehicle 310. As a particular driver drives ego vehicle 100, exhibiting vehicle-following behavior relative to one or more lead vehicles 310 over time, a partially cloud-based ACC system 170 collects and stores vehicle-following-behavior data 210 at a cloud server 320. This collected data becomes part of historical data storage 340. Through driver-vehicle association 330, collected vehicle-following-behavior behavior data 210 is associated with the respective particular drivers to which the data pertains. The vehicle-following-behavior data 210 in historical data storage 340 is input to a GP-model training process 220, which, once trained, can output acceleration commands 230 that are personalized based on a particular driver's learned vehicle-following behavior. A set of ACC parameters 350 modeling the learned vehicle-following behavior of the particular driver is transmitted to an ego vehicle 100 driven by the particular driver so that the vehicle's in-vehicle ACC unit can generate acceleration commands 230 based, at least in part, on that set of ACC parameters 350.

Figure 4:
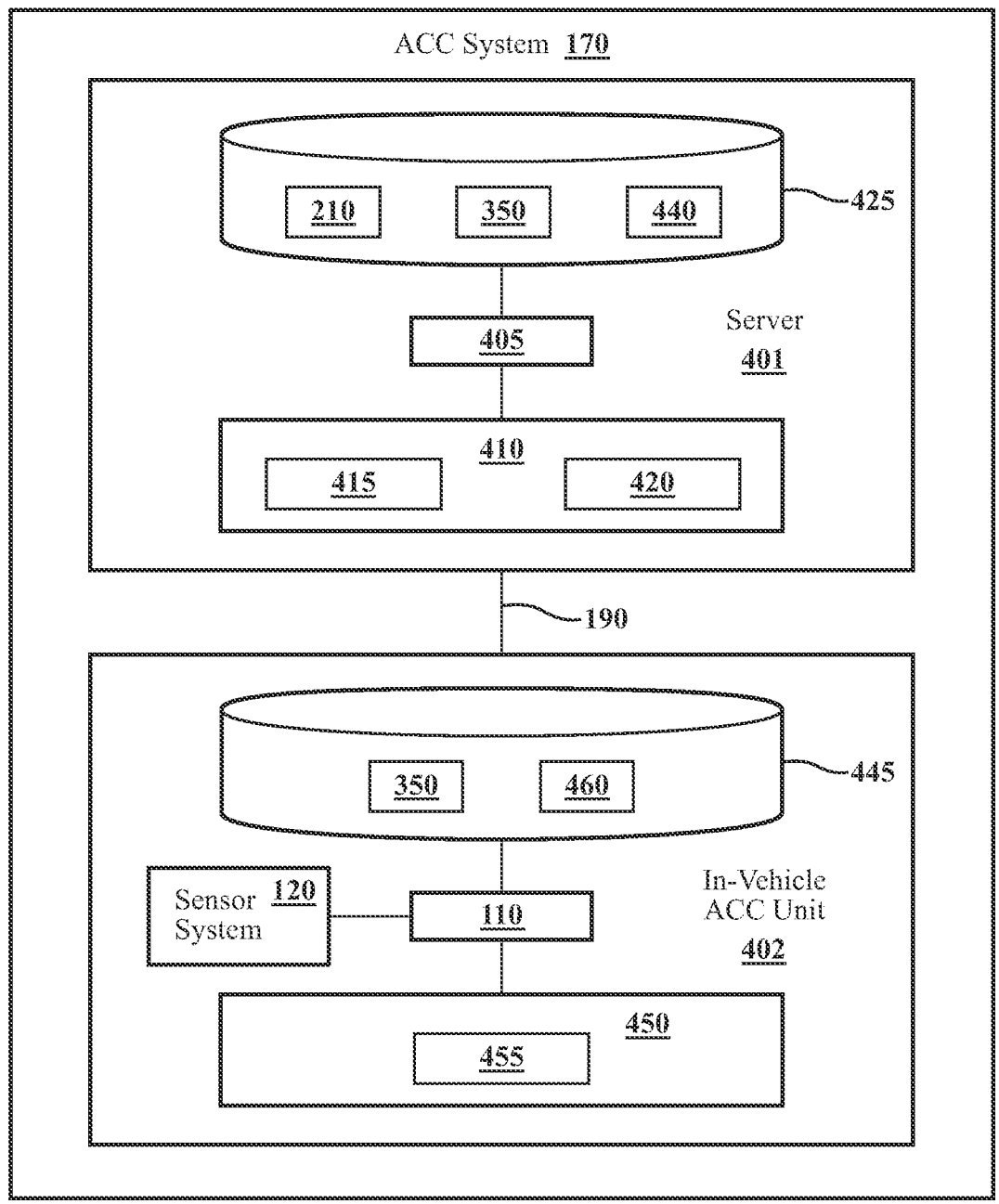
FIG. 4 is a block diagram of an adaptive cruise control system, in accordance with an illustrative embodiment of the invention.

As discussed further below, in some embodiments the GP-model training process 220 is performed by an entirely in-vehicle ACC system 170 instead of the GP-model-training aspect being performed at a cloud or edge server, as depicted in FIG. 3. FIG. 4 pertains to a split server/in-vehicle embodiment, and FIG. 5 pertains to a standalone in-vehicle embodiment.

FIG. 4 is a block diagram of an ACC system 170, in accordance with an illustrative embodiment of the invention. In this embodiment, the functionality of ACC system 170 is divided between a server 401 (e.g., a cloud server or an edge server) and an in-vehicle ACC unit 402. The server 401 and the in-vehicle ACC unit 402 communicate with each other via network 190. Server 401 collects vehicle-following-behavior data 210 for specific identified/associated drivers and trains a GP Regression vehicle-following-behavior model for each particular driver in the relevant driver population. In-vehicle ACC unit 402 receives from server 401, via network 190, a set of ACC parameters 350 for a particular driver who is operating an ego vehicle 100. In-vehicle ACC unit 402 uses the received set of ACC parameters 350 to generate acceleration commands 230 that are vetted for safety by a predictive safety filter 240, the predictive safety filter 240 outputting certified acceleration commands 250 to control acceleration of the vehicle 100 automatically in accordance with the certified acceleration commands 250. In this manner, ACC system 170 can regulate the following distance between a lead vehicle 310 and the ego vehicle 100 in accordance with the learned vehicle-following behavior of the particular driver. The result is a personalized ACC system 170.

Server 401 includes one or more processors 405 and a memory 410. In this embodiment, memory 410 stores a data collection module 415 and a training module 420. The memory 410 is a random-access memory (RAM), read-only memory (ROM), a hard-disk drive, a flash memory, or other suitable memory for storing the modules 415 and 420. The modules 415 and 420 are, for example, computer-readable instructions that, when executed by the one or more processors 405, cause the one or more processors 405 to perform the various functions disclosed herein.

Server 401 also includes a database 425 that stores vehicle-following-behavior data 210 associated with one or more particular (identified/associated) drivers, a set of ACC parameters 350 for each of the one or more particular drivers, and model data 440. Model data 440 can include a variety of different kinds of data, hyperparameters, intermediate calculations, etc., associated with training a GP Regression model.

In-vehicle ACC unit 402 is shown, in FIG. 4, as including one or more processors 110 from the vehicle 100 of FIG. 1. In general, the one or more processors 110 may be a part of ACC system 170. ACC system 170 may include one or more separate processors from the one or more processors 110 of the vehicle 100, or ACC system 170 may access the one or more processors 110 through a data bus or another communication path, depending on the embodiment.

In one embodiment, a memory 450 stores an ACC module 455. The memory 450 is a random-access memory (RAM), read-only memory (ROM), a hard-disk drive, a flash memory, or other suitable memory for storing the ACC module 455. ACC module 455 includes, for example, computer-readable instructions that, when executed by the one or more processors 110, cause the one or more processors 110 to perform the various functions disclosed herein.

In-vehicle ACC unit 402 also includes a database 445 to store a set of ACC parameters 350 for a particular driver (the driver who operates an ego vehicle 100) received from server 401 over network 190. Database 445 can also store, at least temporarily, acceleration commands 460 generated by ACC module 455 based on the received set of ACC parameters 350 for the particular driver. Acceleration commands 460 include both acceleration commands 230 (output by the GP Regression model) and certified acceleration commands 250 output by predictive safety filter 240 (an aspect of ACC module 455).

As shown in FIG. 4, the one or more processors 110 of in-vehicle ACC unit 402 are in communication with sensor system 120 of vehicle 100. As discussed above, sensor data from sensor system 120 (e.g., radar signals) enable ACC module 455 to measure the distance between the front of an ego vehicle 100 and the rear of a lead vehicle dynamically in real time. Before discussing the particular functions performed by the data collection module 415 and the training module 420 of server 401 and the ACC module 455 of in-vehicle ACC unit 402, an overview will first be provided of an entirely in-vehicle embodiment of an ACC system 170.

Figure 5:
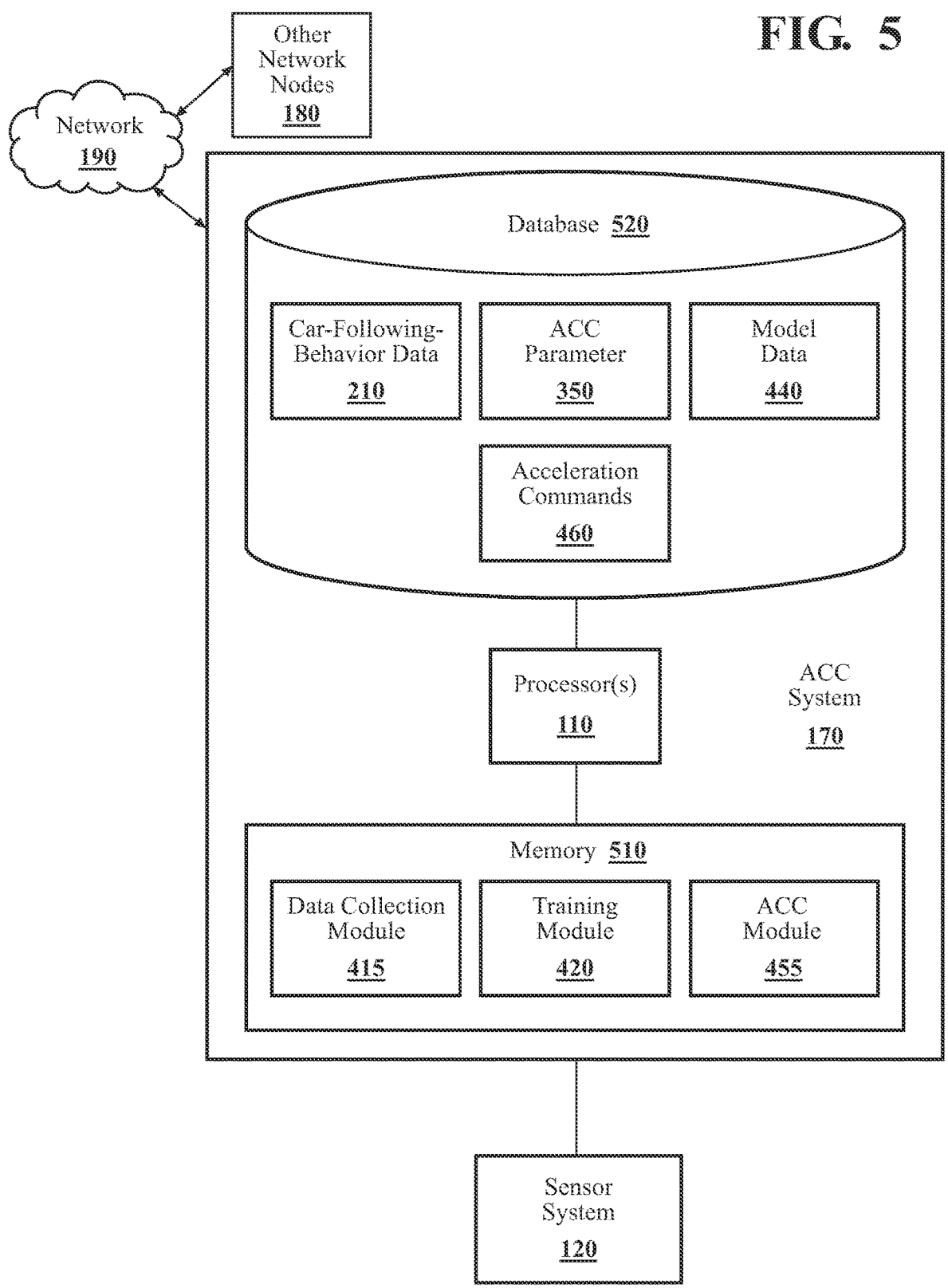
FIG. 5 is a block diagram of an adaptive cruise control system, in accordance with another illustrative embodiment of the invention.

FIG. 5 is a block diagram of an ACC system 170, in accordance with another illustrative embodiment of the invention. In this embodiment, ACC system 170 is a standalone in-vehicle system that performs all of the functions described herein, including collecting vehicle-following-behavior data 210 for a particular driver and the training of a personalized GP Regression model for that driver. As indicated in FIG. 5, one or more processors 110 from the vehicle 100 of FIG. 1 are included in ACC system 170. In general, the one or more processors 110 may be a part of ACC system 170. ACC system 170 may include one or more separate processors from the one or more processors 110 of the vehicle 100, or ACC system 170 may access the one or more processors 110 through a data bus or another communication path, depending on the embodiment.

In one embodiment, a memory 510 stores a data collection module 415, a training module 420, and an ACC module 455. The memory 510 is a random-access memory (RAM), read-only memory (ROM), a hard-disk drive, a flash memory, or other suitable memory for storing the modules 415, 420, and 455. The modules 415, 420, and 455 include, for example, computer-readable instructions that, when executed by the one or more processors 110, cause the one or more processors 110 to perform the various functions disclosed herein.

In this embodiment, ACC system 170 also includes a database 520 to store the collected vehicle-following-behavior data 210, a set of ACC parameters 350 for the particular driver, model data 440, and acceleration commands 460. As discussed above, acceleration commands 460 include both acceleration commands 230 (output by the GP Regression model) and certified acceleration commands 250 output by predictive safety filter 240 (an aspect of ACC module 455).

As shown in FIG. 5, ACC system 170 is in communication with sensor system 120 of vehicle 100. As discussed above, sensor data from sensor system 120 (e.g., radar signals) enable ACC module 455 to measure the distance between the front of an ego vehicle 100 and the rear of a lead vehicle dynamically in real time. Such data forms one of the inputs to the trained GP Regression model, as discussed further below.

As shown in FIG. 5 and as discussed above, ACC system 170 can communicate with one or more other network nodes 180 (e.g., other connected vehicles, cloud servers, edge servers, roadside units, infrastructure) via network 190. In communicating with other connected vehicles, a vehicle 100 can employ Dedicated Short-Range Communications (DSRC), Wi-Fi, or mmWave technology to establish one or more vehicle-to-vehicle (V2V) communication links. In communicating with servers, a vehicle 100 can employ technologies such as cellular data (LTE, 5G, etc.).

The functions discussed below that are performed by the data collection module 415, training module 420, and ACC module 455 apply to both the embodiment discussed above in connection with FIG. 4 (cloud/edge-server-based-training embodiment) and the embodiment discussed above in connection with FIG. 5 (standalone in-vehicle embodiment). In the case of the data collection module 415 and the training module 420, the setting (i.e., where those modules reside) differs, depending on the embodiment.

Data collection module 415 generally includes instructions that when executed by the one or more processors 405/110 cause the one or more processors 405/110 to collect vehicle-following-behavior data 210 associated with a particular driver. Such data is naturalistic driving data (vehicle-following-behavior data) captured as the particular driver operates one or more vehicles over time. In some embodiments, the vehicle-following-behavior data 210 includes the following: (1) space-gap data (the distance between the front of an ego vehicle 100 and the rear of a lead vehicle 310); (2) the speed of the ego vehicle; and (3) the speed of the lead vehicle. In some embodiments, the relative speed between the lead and ego vehicles is computed in connection with the training and/or on-line use of the GP Regression model. Also, in some embodiments, the space gap data can be converted to time-gap data through calculation. Time-gap data refers to the time required, at the ego vehicle's current speed, for the ego vehicle to travel the distance between the front of the ego vehicle and the rear of the lead vehicle.

In an embodiment such as that discussed above in connection with FIG. 4 (a partially cloud-based embodiment), a vehicle 100 operated by the particular driver offloads (transmits), via network 190, the vehicle-following-behavior data 210 to a cloud server 320 (or an edge server, depending on the embodiment) as the particular driver drives the vehicle 100 in a manual driving mode. The vehicle-following-behavior data 210 is collected and stored by data collection module 415 at the cloud server 320 (or at an edge server, as mentioned above, depending on the embodiment).

In an embodiment such as that discussed above in connection with FIG. 5 (a standalone in-vehicle embodiment), data collection module 415 resides in the in-vehicle ACC system 170 of the vehicle 100, and data collection module 415 collects and stores the vehicle-following-behavior data 210 locally at the vehicle as the particular driver drives the vehicle 100 in a manual driving mode. This collected vehicle-following-behavior data 210 is subsequently used as input data in connection with training a GP Regression vehicle-following-behavior model for the particular driver.

Training module 420 generally includes instructions that when executed by the one or more processors 405/110 cause the one or more processors 405/110 to train a GP Regression model using the collected vehicle-following-behavior data 210 to produce a set of ACC parameters 350 pertaining to the particular driver. As discussed above, this set of ACC parameters 350 models the learned vehicle-following behavior of the particular driver. As also discussed above, in some embodiments (see FIG. 4), the set of ACC parameters 350 is generated at a cloud or edge server 401 and transmitted (downloaded) to an in-vehicle ACC unit 402 of an ego vehicle 100 driven by the particular driver. In other embodiments (see FIG. 5), the training of the GP Regression model takes place in a standalone in-vehicle ACC system 170 installed in the vehicle 100, meaning that the set of ACC parameters 350 are generated locally by the standalone in-vehicle ACC system 170.

In some embodiments, training module 420 includes instructions that, when executed by the one or more processors 405/110, cause the one or more processors 405/110 to employ nonlinear output-error (NOE) in the training process to improve training accuracy. GP-NOE is discussed in greater detail below.

ACC module 455 generally includes instructions that when executed by the one or more processors 110 cause the one or more processors 110 to generate an acceleration command 230 for the vehicle 100 based, at least in part, on the set of ACC parameters 350. ACC module 455 produces the acceleration command 230 by processing real-time sensor data (e.g., ego-vehicle speed, lead-vehicle speed, and the measured space gap between the ego vehicle 100 and the lead vehicle 310) from sensor system 120 using the GP Regression model trained by training module 420. ACC module 455 also includes instructions that when executed by the one or more processors 110 cause the one or more processors 110 to apply a predictive safety filter 240 to the acceleration command 230 to produce a certified acceleration command 250 that has been vetted for safety. ACC module 455 also includes instructions that when executed by the one or more processors 110 cause the one or more processors 110 to control acceleration of the vehicle 100 automatically in accordance with the certified acceleration command 250 to regulate the following distance between a lead vehicle and the vehicle 100 in accordance with the learned vehicle-following behavior of the particular driver. In this way, ACC system 170 provides a vehicle 100 with personalized ACC tailored to the learned vehicle-following behavior of a particular driver. ACC system 170 includes an interface for converting the certified acceleration commands 250 from ACC module 455 to low-level control signals for vehicle dynamical system 260 that are compatible with a particular vehicle 100.

This Description proceeds with a more detailed explanation of the implementation of an ACC system 170 and the underlying mathematical principles. This more detailed explanation includes discussion of FIGS. 6A-7.

Problem Formulation

Figure 6A:
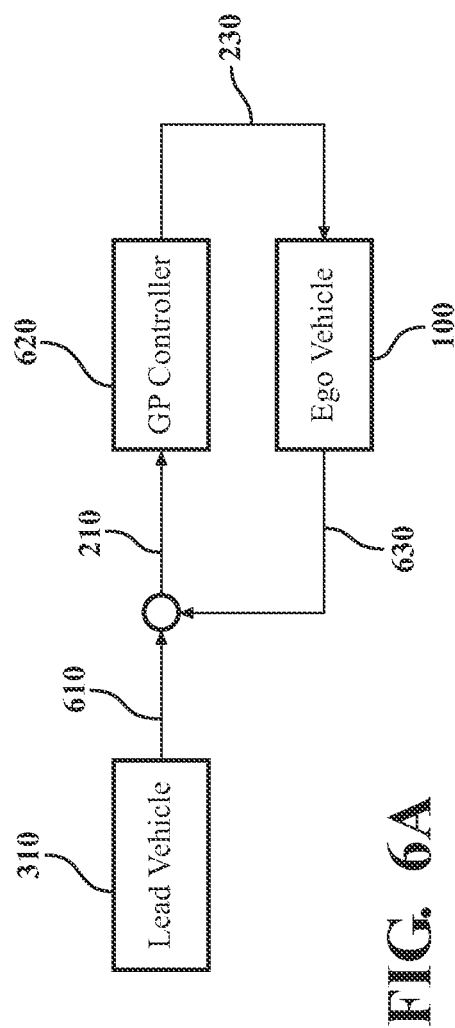
FIG. 6A is a diagram illustrating a problem formulation underlying an adaptive cruise control system, in accordance with an illustrative embodiment of the invention.

FIG. 6A is a diagram illustrating a problem formulation underlying an ACC system 170, in accordance with an illustrative embodiment of the invention. FIG. 6A presents a GP model as a controller for the acceleration of vehicle 100. In FIG. 6A, measurements are taken from a lead vehicle 310. Specifically, lead-vehicle position and velocity 610 are measured. Measurements are also taken from an ego vehicle 100, specifically ego-vehicle position and velocity 630. These are combined to generate the vehicle-following-behavior data 210 discussed above. As discussed above, vehicle-following-behavior data 210 can include, in some embodiments, space gap, ego-vehicle speed, and lead-vehicle speed. The vehicle-following-behavior data 210 is input to a trained GP controller 620, which produces acceleration commands 230 for ego vehicle 100. For simplicity, the predictive safety filter 240 is not shown in FIG. 6A.

Figure 6B:
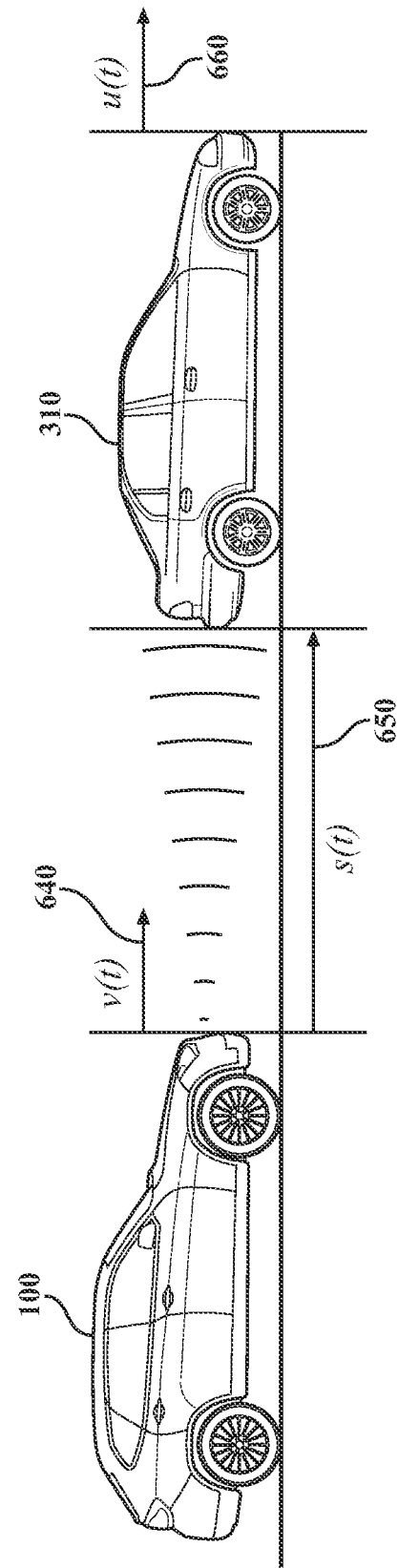
FIG. 6B is a diagram illustrating some key parameters associated with an adaptive cruise control system, in accordance with an illustrative embodiment of the invention.

FIG. 6B is a diagram illustrating some key parameters associated with an ACC system 170, in accordance with an illustrative embodiment of the invention. In FIG. 6B, an ego vehicle 100 is traveling behind a lead vehicle 310 in the same lane of traffic. Ego vehicle 100 is traveling at a velocity v(t) (640). The distance between the front of ego vehicle 100 and the rear of lead vehicle 310, as discussed above, is the space gap s(t) (650). The lead vehicle is traveling at a velocity u(t) (660). Some additional notation and mathematical relationships pertinent to the problem formulation will next be presented.

The state of the controlled vehicle-following system at discrete time k, $x_k=[s_k, v_k, a_k]^T$, is composed of the space gap $s_k$, the ego vehicle's velocity $v_k$, and the ego vehicle's acceleration $a_k$. In terms of discrete time, $u_k$ is the lead vehicle's velocity at time k, and $y_k$ is the measurable output of the system. The actuator delay $\tau$ of a vehicle 100 is accounted for within the vehicle dynamics. The uniform sampling timestep $\Delta t$ is used to discretize the system. $f: \mathbb{R}^3 \to \mathbb{R}^1$ is a nonlinear mapping representing the vehicle-following dynamics, which is learned using the GP Regression model.

The driver's longitudinal acceleration depends on the state of the ego vehicle 100 in relation to the vehicle in front (lead vehicle 310): $\dot{v}(t)=f(s(t), v(t), u(t))$, where $\dot{v}(t)$ is the acceleration of the ego vehicle 100 (the first derivative of velocity). In some embodiments, the dynamics of ego vehicle 100 are updated as follows in discrete time:

$$x_{k+1} = \begin{bmatrix} s \\ v \end{bmatrix}_{k+1} = \begin{bmatrix} s_k + (u_k - v_k)\Delta t \\ v_k + f(s_k, v_k, u_k)\Delta t \end{bmatrix},$$

where the function $f(\ )$ is trained using a GP Regression model. In some embodiments, it is assumed that there are no actuator delays or reaction delays. These assumptions can be relaxed, if command acceleration data is available. The training of the GP controller achieves personalized vehicle-following behavior by minimizing the difference between the predicted acceleration and the recorded naturalistic driving acceleration reflected in the vehicle-following-behavior data 210.

In this problem formulation, the ACC system 170 is viewed as the high-level controller that takes the ego-vehicle speed, lead-vehicle speed, and space gap data as input and produces, as output, an acceleration command 230. The low-level vehicle dynamics can then output the corresponding speed and space gap.

Modeling Vehicle-Following Dynamics

In this section, GP Regression is introduced as a modeling tool that can be used to model vehicle-following behavior. As discussed above, the input to the GP model is the measured space gap, ego-vehicle speed, and lead-vehicle speed. All of these can be measured using environment sensors 122 (e.g., radar sensors) in the sensor system 120 of an ego vehicle 100. The output of the GP controller is the desired acceleration (acceleration commands 230).

A GP Regression model extends multivariate Gaussian distributions to infinite dimensionality. Such a model is a form of supervised learning, and the results of the training process represent a nonlinear mapping $f(z): \mathbb{R}^{dim(z)} \to \mathbb{R}$, such as the expression for the acceleration of the ego vehicle 100 discussed above. The mapping between the input vector z and the function value $f(z)$ is accomplished by the assumption that $f(z)$ for a plurality of different input vectors z are random variables that are jointly Gaussian-distributed with the z's, which themselves are also assumed to be random variables.

The GP model setup includes selecting the model regressors, the mean function, and the covariance function. In the description that follows, the focus is on the commonly used zero-mean and the squared-exponential covariance function. The covariance function relates two function values $f(z_i)$ and $f(z_j)$ by the following covariance function:

$$c(z_i, z_j) = \sigma_f^2 \exp\left(-\frac{1}{2}(z_i - z_j)^T P^{-1}(z_i - z_j)\right) + \sigma_n^2 \delta_{ij},$$

where the Kronecker delta function $\delta_{ij}=1$ iff i=j and 0 otherwise, and $P=\text{diag}[l_1^2, \ldots, l_{dim(z)}^2]$ contains the characteristic length scale $l_i$ for each dimension i of the input. The hyperparameters of the covariance function include the measurement noise $\sigma_n$, the process standard deviation $\sigma_f$, and the characteristic length scales $l_i$. The hyperparameter vector $\theta=[\sigma_f, \sigma_n, l_i]^T$ is learned by maximizing the likelihood of the observation.

Some embodiments of ACC system 170 employ Bayesian model inference. The inference of a Bayesian model is a process in which the prior knowledge of the hyperparameter vector $\theta$ is updated to a posterior distribution through the identification (training) data. The training input Z and target y for a total of N samples are specified as follows: $Z=[z_1, z_2, \ldots, z_N]^T$ and $y=[y_1, y_2, \ldots, y_N]^T$, where the subscript denotes the sample index.

The corresponding GP model can be used for predicting the function value distribution $y_*$ given an arbitrary input $z_*$ based on a set of past observations $\mathcal{D}=\{Z, y\}$: $y_*=f_{GP}(z_*, \theta)+\mathcal{N}(0, \sigma_n^2)$, where the assumed white noise of the observation $\mathcal{N}(0, \sigma_n^2)$ is folded into the covariance function defined above. The prediction can be accomplished based on the key assumption that the data can be represented as a sample from a multivariate Gaussian distribution:

$$\begin{bmatrix} y \\ y_* \end{bmatrix} \sim \mathcal{N}\left(0, \begin{bmatrix} K & K_*^T \\ K_* & K_{**} \end{bmatrix}\right),$$

where $0 \in \mathbb{R}^N$ is a vector of zeros, and K is the following covariance matrix:

$$K = \begin{bmatrix} c(z_1, z_1), c(z_1, z_2) & \ldots & c(z_1, z_N) \\ c(z_2, z_1), c(z_2, z_2) & \ldots & c(z_2, z_N) \\ \ldots & , & \ldots \\ c(z_N, z_1), c(z_N, z_2) & \ldots & c(z_N, z_N) \end{bmatrix},$$

$K_*=[c(z_*, z_1), c(z_*, z_2) \ldots c(z_*, z_N)]$, and $K_{**}=c(z_*, z_*)$. The quantity of interest is the probability of the output given the data set, i.e., $p(y_*|\mathcal{D})$. The corresponding mean and variance are, respectively, $\bar{y}_*=K_*K^{-1}y$ and $\text{var}(y_*)=K_{**}-K_*K^{-1}K_*^T$. The objective is to infer $\theta$ by computing the posterior distribution of the hyperparameters:

$$p(\theta | Z, y) = \frac{p(y | Z, \theta)p(\theta)}{p(y | Z)},$$

where $p(\theta)$ is the prior distribution on the hyperparameters, $p(y|Z, \theta)$ is the likelihood, and $p(y|Z)$ is the evidence. The computation of the evidence is usually intractable, but a possible solution is to use numerical approximation to obtain a point estimate of the posterior $p(\theta|Z, y)$. One common practice for hyperparameter estimation is to use a maximization algorithm that is described below.

Assuming unknown prior $p(\theta)$ (uniform distributed $p(\theta)$), the posterior distribution is proportional to the marginal likelihood, i.e., $p(\theta|Z, y) \propto p(y|Z, \theta)$. Maximizing the posterior is thus equivalent to maximizing the marginal likelihood:

$$p(y | Z, \theta) = \frac{1}{(2\pi)^{N/2}|K|^{1/2}} \exp\left(-\frac{1}{2} y^T K^{-1} y\right).$$

Due to the mathematical properties of the logarithm function for the numerical scaling purposes, maximizing the posterior is equivalent to minimizing the negative log likelihood:

$$\ln p(y | Z, \theta) = l(\theta) = -\frac{1}{2}\ln|K| - \frac{1}{2}y^T K^{-1} y - \frac{N}{2}\ln(2\pi).$$

Maximizing the evidence leads to solving a nonlinear, non-convex problem. Even though existing optimization solvers cannot necessarily find a global optimum, the GP model is usually shown to explain the data.

In the various embodiments described herein, a GP in the form of a vehicle-following model is used to model the personalized longitudinal acceleration of a particular driver. The GP model plays a role as an upper-level longitudinal controller, which determines the desired acceleration for the vehicle. The acceleration commands 230 output by ACC module 455 can be mapped to low-level vehicle dynamics (e.g., the throttle input required to track the desired acceleration) using techniques known to those skilled in the art.

Since regressing on the acceleration data can lead to a higher error in speed and space gap, in some embodiments ACC module 455 includes instructions to adopt a nonlinear output-error (NOE) approach to improve the training accuracy. The training process and NOE are described next.

In some embodiments, a training process similar to that used to calibrate an ordinary-differential-equation (ODE)-based vehicle-following model is employed. This process involves finding the parameters for which the simulated state is closest to the recorded measurement. The simulated state can be obtained via $$\hat{x}_{k+1} = \begin{bmatrix} \hat{s} \\ \hat{v} \end{bmatrix}_{k+1} = \begin{bmatrix} \hat{s}_k + (u_k - \hat{v}_k)\Delta t \\ \hat{v}_k + f_{GP}(\hat{z}_k, \theta)\Delta t \end{bmatrix}$$

and $\hat{x}_1=x_1=[s_1, v_1]$, k=1: N−1, where $\hat{z}_k=[\hat{s}_k, \hat{v}_k, u_k]$ contains the simulated state and the measured external input at time k, as opposed to the recorded data $z_k=[s_k, v_k, u_k]$. The simulation also begins with an initial estimate of the hyperparameters $\theta$. The training target is the acceleration data shifted one time step forward: $y_{2:N}$.

An algorithm for GP-NOE is next presented. First, define $\hat{Z}_{2:N}=[\hat{z}_2, \hat{z}_3, \ldots, \hat{z}_N]^T$. In some embodiments, the training of the GP Regression model with NOE structure is an iterative process performed as follows:

repeat
    Obtain the simulated regression vectors $\hat{Z}_{2:N}$ with the initial state $x_1=[s_1, v_1]$ and the current hyperparameters $\theta$, as defined above.
    Update $\theta$ by evaluating the likelihood function $p(y_{2:N}|Z_{2:N}, \theta)$ or minimizing the corresponding negative log likelihood $l(\theta)$, as defined above.
until $l(\theta)$ is minimal.

Figure 7:
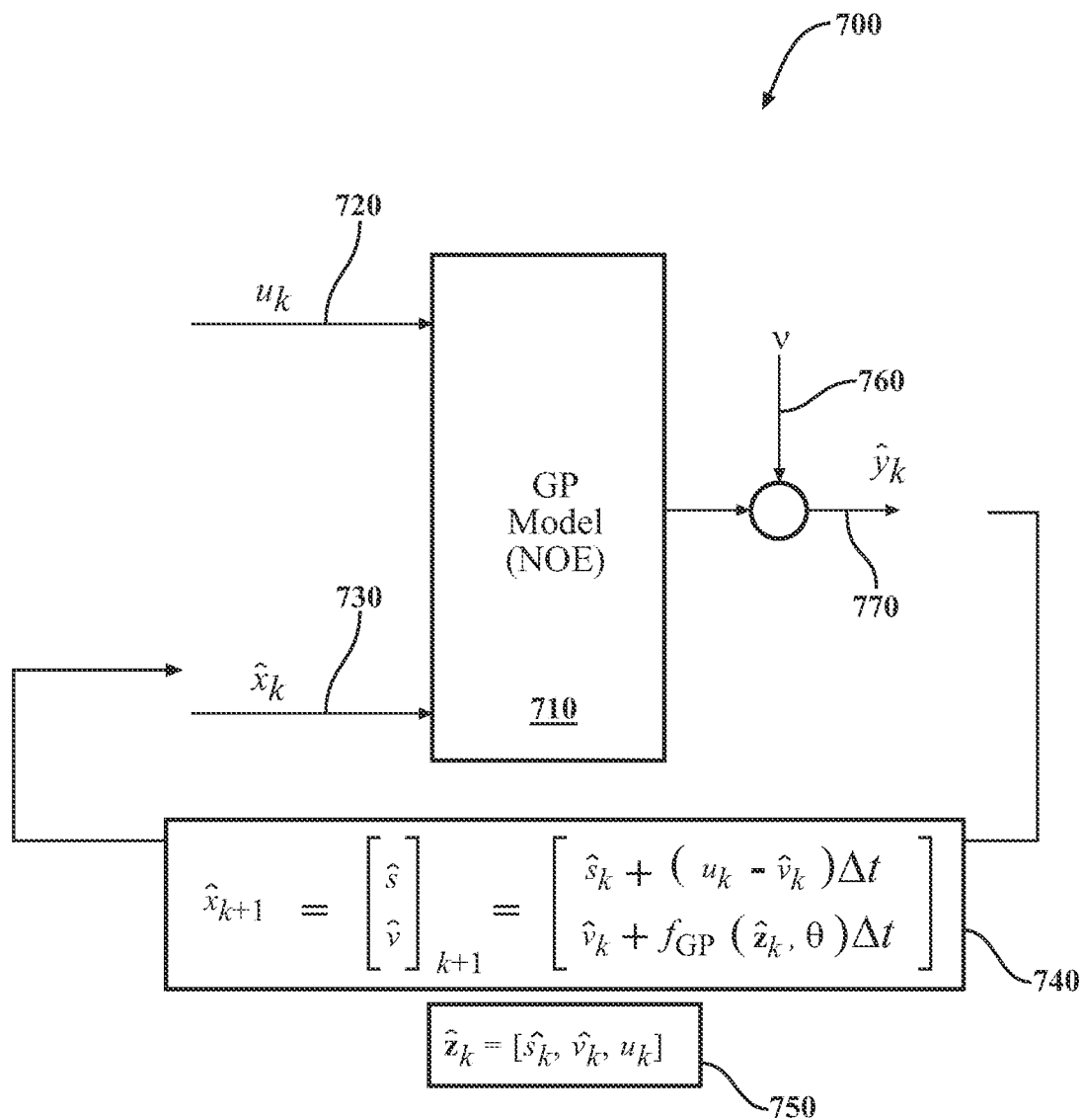
FIG. 7 is a diagram of a Gaussian Process nonlinear output-error structure and associated training process, in accordance with an illustrative embodiment of the invention.

FIG. 7 is a diagram of a GP-NOE structure and associated training process, in accordance with an illustrative embodiment of the invention. As shown in FIG. 7, GP model (NOE) 710 receives, as inputs, the lead-vehicle speed 720 and the estimated (pseudo) state 730 from the estimated output. The GP model (NOE) 710 produces the output acceleration 770. The parameter v is a prediction uncertainty parameter 760. Since the output acceleration 770 is a distribution, the mean of that distribution $\hat{y}_k$ is taken as the acceleration command 230 discussed above. The prediction uncertainty v (760) represents the confidence associated with the GP prediction.

As discussed above, in some embodiments ACC module 455 includes instructions to apply a predictive safety filter 240 to the acceleration commands 230 to produce certified acceleration commands 250 that are ultimately used to control the acceleration of an ego vehicle 100. Once the the GP model parameters that enable ACC system 170 to provide personalized vehicle-following guidance have been obtained, the predictive safety filter 240 can be applied to ensure that safety requirements (e.g., not coming excessively close to or colliding with the lead vehicle 310) are met. The safety certification problem can be formulated as the following constraint optimization problem:

$$\min_y \|\hat{y}_{k:k+N} - y_{k:k+N}\|$$

$$\text{s. t. } \hat{y}_{k:k+N} = f(x_k, u_{k:k+N}) \rightarrow \text{GP simulation}$$

$$\hat{x}_{k:k+N} = g(x_k, y_{k:k+N}) \rightarrow \text{vehicle dynamics}$$

$$Pr(\hat{x}_k, y_k, u_k \in \mathbb{X} \times \mathbb{Y} \times \mathbb{U}) \geq p \rightarrow \text{safety constraint}$$

where the objective is to modify the GP controller output for the next N time steps $\hat{y}_{k:k+N}$ as little as possible. The predicted states are derived such that the ACC system 170 of the vehicle 100 implements the GP control commands for the next N time steps. The constraints ensure that the probability that the predicted states fall within a safe set exceeds a predetermined probability threshold p. This formulation ensures a minimum of intervention in the GP control while, at the same time, preserving safety.

Methods of the Various Embodiments

Figure 8:
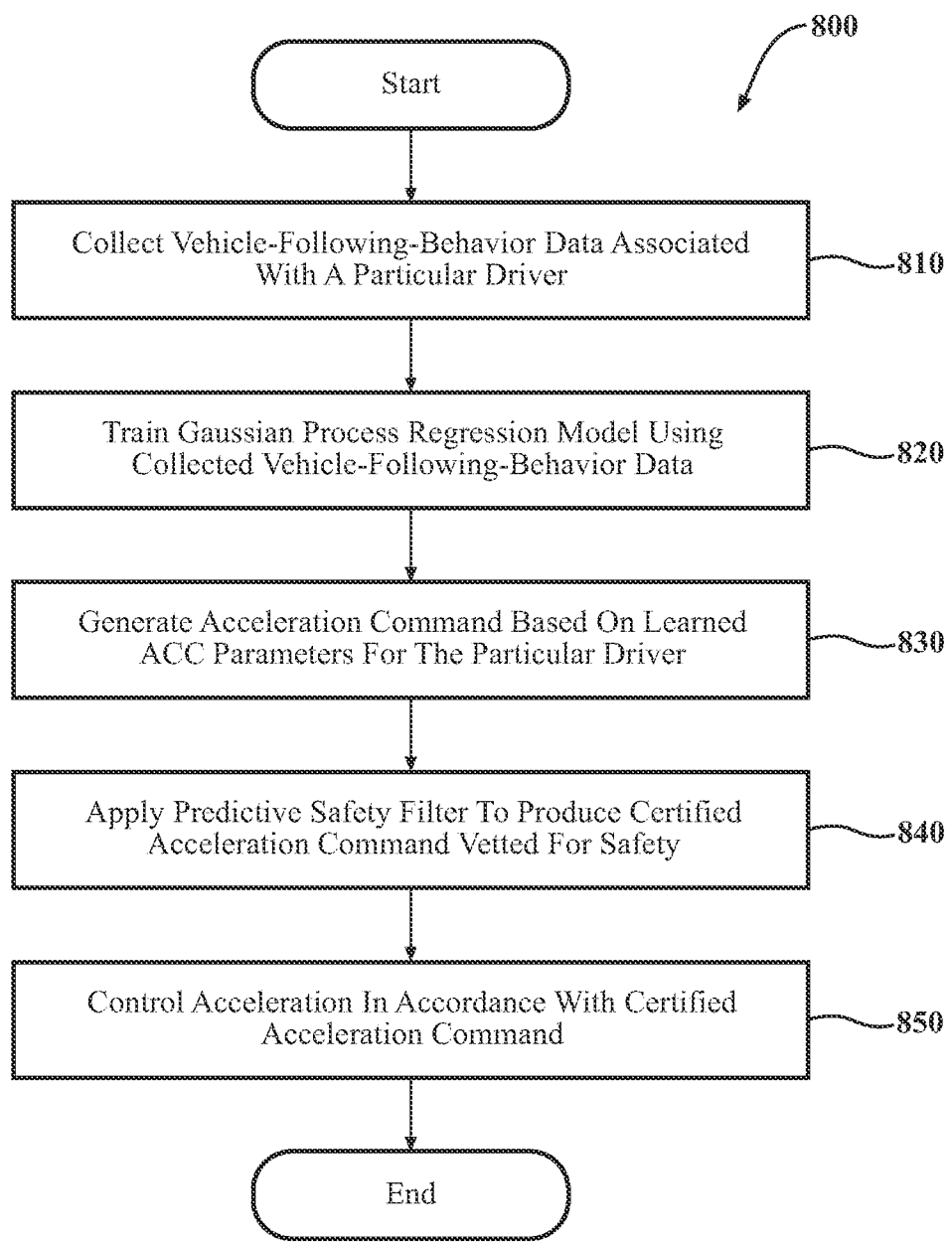
FIG. 8 is a flowchart of a method of personalizing adaptive cruise control in a vehicle, in accordance with an illustrative embodiment of the invention.

FIG. 8 is a flowchart of a method 800 of personalizing ACC in a vehicle 100, in accordance with an illustrative embodiment of the invention. Method 800 will be discussed from the perspective of the ACC system 170 in FIG. 4 or 5, depending on the particular embodiment. While method 800 is discussed in combination with ACC system 170, it should be appreciated that method 800 is not limited to being implemented within ACC system 170, but ACC system 170 is instead one example of a system that may implement method 800.

At block 810, data collection module 415 collects vehicle-following-behavior data 210 associated with a particular driver. As discussed above, such data is naturalistic driving data (vehicle-following-behavior data) captured as the particular driver operates one or more vehicles over time. In some embodiments, the vehicle-following-behavior data 210 includes the following: (1) space-gap data (the distance between the front of an ego vehicle and the rear of a lead vehicle); (2) the speed of the ego vehicle; and (3) the lead vehicle's speed. In some embodiments, the relative speed between the lead and ego vehicles is also be computed. Also, in some embodiments, the space gap data can be converted to time-gap data through calculation.

In an embodiment such as that discussed above in connection with FIG. 4 (a partially-cloud-based embodiment), a vehicle 100 operated by the particular driver offloads (transmits), via network 190, the vehicle-following-behavior data 210 to a cloud server 320 (or an edge server, depending on the embodiment) as the particular driver drives the vehicle 100. The vehicle-following-behavior data 210 is collected and stored by data collection module 415 at the cloud server 320 (or at an edge server, as mentioned above).

In an embodiment such as that discussed above in connection with FIG. 5 (a standalone in-vehicle embodiment), data collection module 415 resides in the in-vehicle ACC system 170 of the vehicle 100, and data collection module 415 collects and stores the vehicle-following-behavior data 210 locally at the vehicle as the particular driver drives the vehicle 100 in a manual driving mode. This collected vehicle-following-behavior data 210 serves as input to train the GP Regression model.

At block 820, training module 420 trains a GP Regression model using the collected vehicle-following-behavior data 210 to produce a set of ACC parameters 350 pertaining to the particular driver. As discussed above, the set of ACC parameters 350 models learned vehicle-following behavior of the particular driver. As also discussed above, in some embodiments (see FIG. 4), the set of ACC parameters 350 is generated at a cloud or edge server 401 and transmitted (downloaded) to an in-vehicle ACC unit 402 of an ego vehicle 100 driven by the particular driver. In other embodiments (see FIG. 5), the training of the GP Regression model takes place in a standalone in-vehicle ACC system 170 installed in the vehicle 100, meaning that the set of ACC parameters 350 are generated locally by the standalone in-vehicle ACC system 170.

In some embodiments, method 800 includes employing nonlinear output-error (NOE) in the training process to improve training accuracy. In such an embodiment, training module 420 includes additional instructions for that purpose. NOE is discussed in greater detail above.

At block 830, ACC module 455 generates an acceleration command 230 for the vehicle 100 based, at least in part, on the set of ACC parameters 350. As discussed above, ACC module 455 produces the acceleration command 230 by processing real-time sensor data (e.g., ego-vehicle speed, lead-vehicle speed, and the measured space gap between the ego vehicle 100 and the lead vehicle 310) from sensor system 120 using the GP Regression model trained by training module 420.

At block 840, ACC module 455 applies a predictive safety filter 240 to the acceleration command 230 to produce a certified acceleration command 250 that has been vetted for safety. As explained above, certified acceleration commands 250 from predictive safety filter 240 are used to control vehicle dynamical system 260 (e.g., aspects of vehicle 100 involving acceleration and deceleration such as an engine throttle and a braking system). In this context, "certified" simply means that the acceleration commands have been processed by the predictive safety filter 240 to ensure that they satisfy safety requirements. In other words, the certified acceleration commands have been vetted for safety through being processed by predictive safety filter 240. In some cases, this means that predictive safety filter 240 modifies an acceleration command 230 somewhat for safety reasons. In other cases, an acceleration command 230 might not undergo alteration by predictive safety filter 240, if the original acceleration command 230 already satisfies safety requirements. The predictive safety filter 240 is discussed in greater detail above.

At block 850, ACC module 455 controls acceleration of the vehicle 100 automatically in accordance with the certified acceleration command 250 to regulate the following distance between a lead vehicle 310 and the vehicle 100 in accordance with the learned vehicle-following behavior of the particular driver. As discussed above, ACC system 170 includes an interface for converting the certified acceleration commands 250 from ACC module 455 to low-level control signals for vehicle dynamical system 260 that are compatible with a particular vehicle 100.

In some embodiments, method 800 includes additional actions that are not shown in FIG. 8. For example, in some embodiments, method 800 includes updating the set of ACC parameters 350 pertaining to the particular driver by further training the GP Regression model based on additional collected vehicle-following-behavior data 210 associated with the particular driver. In such embodiments, training module 420, whether at a server 401 or in the vehicle 100, includes additional instructions for that purpose.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-8, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for personalizing adaptive cruise control in a vehicle, the system comprising:
   one or more processors; and
   at least one memory communicably coupled to at least one of the one or more processors and storing:
   a data collection module including instructions that when executed by the one or more processors cause the one or more processors to collect vehicle-following-behavior data associated with a particular driver;
   a training module including instructions that when executed by the one or more processors cause the one or more processors to train, employing nonlinear output-error (NOE) to improve training accuracy, a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver;
   an ACC module including instructions that when executed by the one or more processors cause the one or more processors to:
   generate an acceleration command for the vehicle based, at least in part, on the set of ACC parameters;
   apply a predictive safety filter to the acceleration command to produce a certified acceleration command that has been vetted for safety; and
   control acceleration of the vehicle automatically in accordance with the certified acceleration command to regulate a following distance between a lead vehicle and the vehicle in accordance with the learned vehicle-following behavior of the particular driver.

2. The system of claim 1, wherein the vehicle-following-behavior data associated with the particular driver includes space gap, ego-vehicle speed, and lead-vehicle speed.

3. The system of claim 1, wherein the data collection module and the training module are stored in a memory among the at least one memory that resides in one of a cloud server and an edge server and the training module includes further instructions that when executed by the one or more processors cause the one or more processors to transmit the set of ACC parameters from one of the cloud server and the edge server to the vehicle.

4. The system of claim 1, wherein the data collection module and the training module are stored in a memory among the at least one memory that resides in an ACC system installed in the vehicle.

5. The system of claim 1, wherein the training module includes further instructions that when executed by the one or more processors cause the one or more processors to update the set of ACC parameters pertaining to the particular driver by further training the GP Regression model based on additional collected vehicle-following-behavior data associated with the particular driver.

6. The system of claim 1, wherein the vehicle is steered by the particular driver.

7. The system of claim 1, wherein the vehicle is operating in an autonomous driving mode.

8. A non-transitory computer-readable medium for personalizing adaptive cruise control in a vehicle and storing instructions that when executed by one or more processors cause the one or more processors to:
collect vehicle-following-behavior data associated with a particular driver;
train, employing nonlinear output-error (NOE) to improve training accuracy, a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver;
generate an acceleration command for the vehicle based, at least in part, on the set of ACC parameters;
apply a predictive safety filter to the acceleration command to produce a certified acceleration command that has been vetted for safety; and
control acceleration of the vehicle automatically in accordance with the certified acceleration command to regulate a following distance between a lead vehicle and the vehicle in accordance with the learned vehicle-following behavior of the particular driver.

9. The non-transitory computer-readable medium of claim 8, wherein the vehicle-following-behavior data associated with the particular driver includes space gap, ego-vehicle speed, and lead-vehicle speed.

10. The non-transitory computer-readable medium of claim 8, wherein the instructions include further instructions to update the set of ACC parameters pertaining to the particular driver by further training the GP Regression model based on additional collected vehicle-following-behavior data associated with the particular driver.

11. A method of personalizing adaptive cruise control in a vehicle, the method comprising:
collecting vehicle-following-behavior data associated with a particular driver;
training, employing nonlinear output-error (NOE) to improve training accuracy, a Gaussian Process (GP) Regression model using the collected vehicle-following-behavior data to produce a set of adaptive-cruise-control (ACC) parameters pertaining to the particular driver, the set of ACC parameters modeling learned vehicle-following behavior of the particular driver;
generating an acceleration command for the vehicle based, at least in part, on the set of ACC parameters;
applying a predictive safety filter to the acceleration command to produce a certified acceleration command that has been vetted for safety; and
controlling acceleration of the vehicle automatically in accordance with the certified acceleration command to regulate a following distance between a lead vehicle and the vehicle in accordance with the learned vehicle-following behavior of the particular driver.

12. The method of claim 11, wherein the vehicle-following-behavior data associated with the particular driver includes space gap, ego-vehicle speed, and lead-vehicle speed.

13. The method of claim 11, wherein the collecting the vehicle-following-behavior data associated with the particular driver and the training the GP Regression model are performed by one of a cloud server and an edge server and the method further comprises transmitting the set of ACC parameters from one of the cloud server and the edge server to the vehicle.

14. The method of claim 11, wherein the collecting the vehicle-following-behavior data associated with the particular driver and the training the GP Regression model are performed by an ACC system installed in the vehicle.

15. The method of claim 11, further comprising updating the set of ACC parameters pertaining to the particular driver by further training the GP Regression model based on additional collected vehicle-following-behavior data associated with the particular driver.

16. The method of claim 13, wherein the vehicle is steered by the particular driver.

17. The method of claim 11, wherein the vehicle is operating in an autonomous driving mode.

* * * * *